US008370914B2

(12) United States Patent
Dalzell et al.

(10) Patent No.: US 8,370,914 B2
(45) Date of Patent: Feb. 5, 2013

(54) TRANSITION FROM WS-FEDERATION PASSIVE PROFILE TO ACTIVE PROFILE

(75) Inventors: Javier Dalzell, Issaquah, WA (US); Christian Roy, Redmond, WA (US); William David Taylor, Redmond, WA (US); Venkatesh Veeraraghavan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 247 days.

(21) Appl. No.: 12/968,823

(22) Filed: Dec. 15, 2010

(65) Prior Publication Data
US 2012/0159601 A1    Jun. 21, 2012

(51) Int. Cl.
*G06F 21/00* (2006.01)
(52) U.S. Cl. .................................. 726/9; 726/5
(58) Field of Classification Search .................... None
See application file for complete search history.

(56) References Cited

U.S. PATENT DOCUMENTS

| | | | |
|---|---|---|---|
| 2003/0163733 A1* | 8/2003 | Barriga-Caceres et al. .. | 713/201 |
| 2004/0230831 A1* | 11/2004 | Spelman et al. ............. | 713/201 |
| 2005/0144452 A1* | 6/2005 | Lynch et al. ................. | 713/170 |
| 2005/0204148 A1* | 9/2005 | Mayo et al. .................. | 713/185 |
| 2006/0048216 A1* | 3/2006 | Hinton et al. ................ | 726/8 |
| 2006/0123472 A1 | 6/2006 | Schmidt | |
| 2007/0208936 A1* | 9/2007 | Ramos Robles ............. | 713/168 |
| 2007/0289002 A1* | 12/2007 | van der Horst et al. ........ | 726/9 |
| 2009/0259753 A1* | 10/2009 | Hinton et al. ................ | 709/226 |
| 2009/0265554 A1* | 10/2009 | Robles et al. ................ | 713/168 |
| 2009/0292925 A1* | 11/2009 | Meisel ........................ | 713/176 |
| 2009/0320095 A1 | 12/2009 | Nanda | |
| 2010/0077216 A1* | 3/2010 | Kramer et al. ................ | 713/172 |
| 2010/0154046 A1* | 6/2010 | Liu et al. ..................... | 726/8 |
| 2011/0231918 A1* | 9/2011 | Shah et al. .................. | 726/8 |

OTHER PUBLICATIONS

"Federation of Identities in a Web Services World" International Business Machines Corporation © 2001-2003; 14 pages.
Baier, Dominick; "Thinktecture Security Token Service Kit" May 26, 2009; 5 pages.
Bustamante, Michele Laroux; "Passive Authentication for ASP.NET with WIF" © 2010; 16 pages.
Groβ et al.; "Proving a WSFederation Passive Requestor Profile with a Browser Model" © 2005; 11 pages.
Singhal et al; "Guide to Secure Web Services" Aug. 2007; 128 pages.
Bajaj et al; "WS-Federation: Passive Requestor Profile" Jul. 8, 2003; 32 pages.
Bajaj et al; "WS-Federation: Active Requestor Profile" Jul. 8, 2003; 18 pages.
Lawrence et al; "WS-Trust 1.4" Feb. 2, 2009; 85 pages.
Lawrence et al; "Web Services Security: SOAP Message Security 1.1" Feb. 1, 2006; 76 pages.

(Continued)

*Primary Examiner* — Jeffrey Pwu
*Assistant Examiner* — Nega Woldemariam
(74) *Attorney, Agent, or Firm* — Merchant & Gould

(57) ABSTRACT

A server system sends a first credential request to a passive requestor at a client device. After sending the first credential request, the server system receives a credential for a user of the client device. If the credential is valid, the server system can provide the passive requestor with access to a resource provided by the server system. After providing the passive requestor with access to the resource, the server system provides an active requestor at the client device with access to the resource without sending a second credential request to the active requestor. Consequently, it may not be necessary for a user of the client device to provide credentials twice in order for the passive requestor and the active requestor to access the resource.

12 Claims, 7 Drawing Sheets

OTHER PUBLICATIONS

Lockhart et al; "Web Services Federation Language" Dec. 2006; 124 pages.

Ballinger et al; "Web Services Metadata Exchange" Feb. 2004; 28 pages.

* cited by examiner

TRANSITION FROM WS-FEDERATION PASSIVE PROFILE TO ACTIVE PROFILE

BACKGROUND

There are many circumstances in which online resources should only be accessible to authorized people. For example, a company's employee directory may a resource that only authorized people should be able to see. Accordingly, many systems have been developed to determine whether a person seeking to access a resource is authorized to access the resource.

The Organization for the Advancement of Structured Information Standards (OASIS) has advanced a set of related standards for determining whether users are authorized to access web services. These standards include WS-MetadataExchange, WS-Security, WS-Trust, WS-Federation, and others. Typically, a web service is an application programming interface (API) that is accessed via Hypertext Transfer Protocol (HTTP) and executed on a remote system that hosts the requested service. For example, a web service can be a web API that provides access to a company's employee directory. A web API is an API that is accessed via HTTP and executed on a remote system that hosts the requested service.

The standards advanced by OASIS rely at least to some degree on the exchange of security tokens. A security token is a data structure representing a collection of claims. A claim is a declaration by an entity. A web service can require users to present security tokens issued by a Security Token Service trusted by the web service in order for the web service to allow the users to access the web service. Moreover, the security tokens must include certain claims. For example, a web service can require security tokens to include claims declaring that the users are in the accounting department of a company.

The WS-Federation standard provides for at least two ways for a client to obtain a security token from a Security Token Service and to use the security token to access a web service. These ways include the WS-Federation Passive Requestor Profile and the WS-Federation Active Requestor Profile. Clients that do not utilize the SOAP protocol typically use the WS-Federation Passive Requestor Profile. For instance, web browser applications typically use the WS-Federation Passive Requestor Profile to obtain and use security tokens. Clients that utilize the SOAP protocol can use the WS-Federation Active Requestor Profile. Thick-client applications, such as workplace productivity applications, typically use the WS-Federation Active Requestor Profile to obtain and use security tokens. In some instances, clients using the WS-Federation Active Requestor Profile can obtain and use security tokens more efficiently than clients using the WS-Federation Passive Requestor Profile because fewer messages may need to be sent across a network when using the WS-Federation Active Requestor Profile.

In some instances, a client may use both the WS-Federation Passive Requestor Profile and the WS-Federation Active Requestor Profile. For example, a complex thick-client application can include several components developed at different times. In this example, an earlier-developed component in the client application can be programmed to use the WS-Federation Passive Requestor Profile to access a web service while a later-developed component in the same client application can be programmed to use the WS-Federation Active Requestor Profile to access the same web service. In this example, a client application can include components that use the WS-Federation Passive Requestor Profile and components that use the WS-Federation Active Requestor Profile because it may be too costly to reprogram the components to use the WS-Federation Passive Requestor Profile.

In instances where components of a client application use both the WS-Federation Passive Requestor Profile and the WS-Federation Active Requestor Profile, a user may need to provide a credential when one component of the client application uses the WS-Federation Passive Requestor Profile to obtain a security token to access a web service. For instance, a user may need to provide a username and password when one of the components uses the WS-Federation Passive Requestor Profile to obtain a security token to access a web service. Subsequently, the user may need to provide the same credential again when another component of the client application uses the WS-Federation Active Requestor Profile to obtain a security token to access the same web service. The user may find it annoying to provide the same credential twice to access the same web service.

SUMMARY

A client device prompts a user to provide a credential while obtaining a first security token from a Security Token Service (STS) provided by a server system. The client device later sends a first access request to the server system. The first access request comprises a HTTP request whose fulfillment entails accessing a resource provided by the server system. The first access request includes the first security token. After obtaining the first security token, the client device obtains a second security token from the STS without prompting the user for a credential for a second time. Furthermore, after obtaining the second security token, the client device sends a second access request to the server system. The second access request comprises a SOAP request whose fulfillment entails accessing a second resource provided by the server system. The second access request includes the second security token. In this way, it may not be necessary for the user to provide credentials twice in order for the client device to access the first resource and the second resource.

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

DETAILED DESCRIPTION

Figure 1:
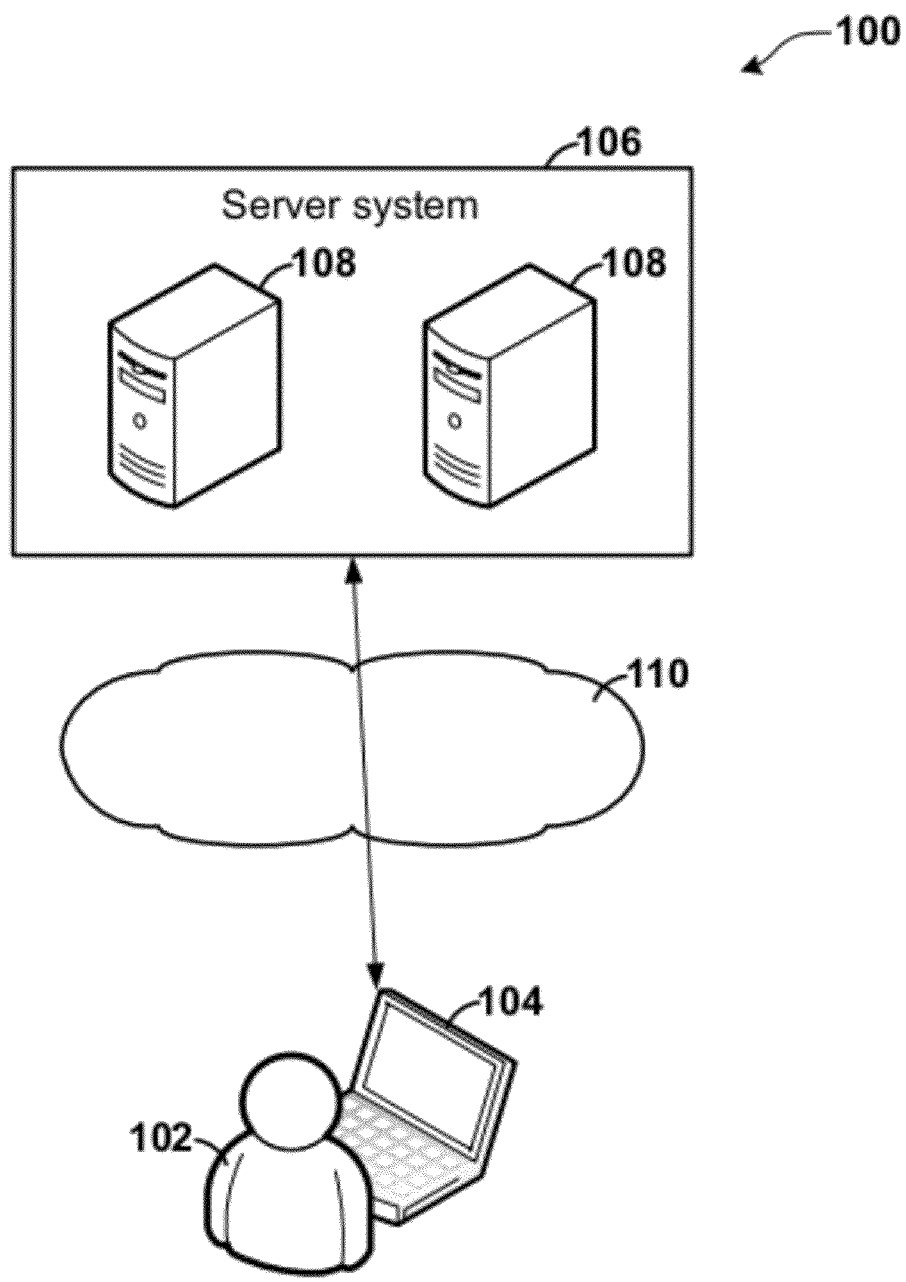
FIG. 1 is a diagram illustrating an example environment for one or more embodiments.

FIG. 1 is a diagram illustrating an example environment 100 for one or more embodiments. As illustrated in the example of FIG. 1, the environment 100 includes a user 102. The user 102 is a person. The user 102 uses a client device 104.

The client device 104 is a computing device. For example, the client device 104 can be a laptop computer, a desktop computer, a netbook computer, a handheld computer, a smart phone, a television set top box, a video game console, an in-car computer, a personal media player, or another type of computing device. In some embodiments, the client device 104 is of the type described below with reference to the example of FIG. 7. Although the client device 104 is shown in the example of FIG. 1 as a laptop computer, it should be appreciated that the client device 104 can be other types of computing devices.

Furthermore, the example environment 100 of FIG. 1 includes a server system 106. The server system 106 comprises a set of one or more computing devices 108. In various embodiments, the computing devices 108 can belong to various computing device types. For example, one or more of the computing devices 108 can be standalone servers, blade server devices, mainframe computers, routers, firewall devices, data storage devices, and other types of computing devices. Although the computing devices 108 are shown in the example of FIG. 1 as being standalone server devices, it should be appreciated that the computing devices 108 can be other types of computing devices. In some embodiments, the computing devices 108 can be of the type described below with reference to the example of FIG. 7.

A network 110 facilitates communication between the client device 104 and the server system 106. In various embodiments, the network 110 can include various types of communication network. For example, the network 110 can include the Internet. In another example, the network 110 can include a local-area network, a personal-area network, a wide-area network, or another type of network. The network 110 includes one or more links that facilitate communication between computing devices connected to the network 110. These links can include wired or wireless links.

Figure 2:
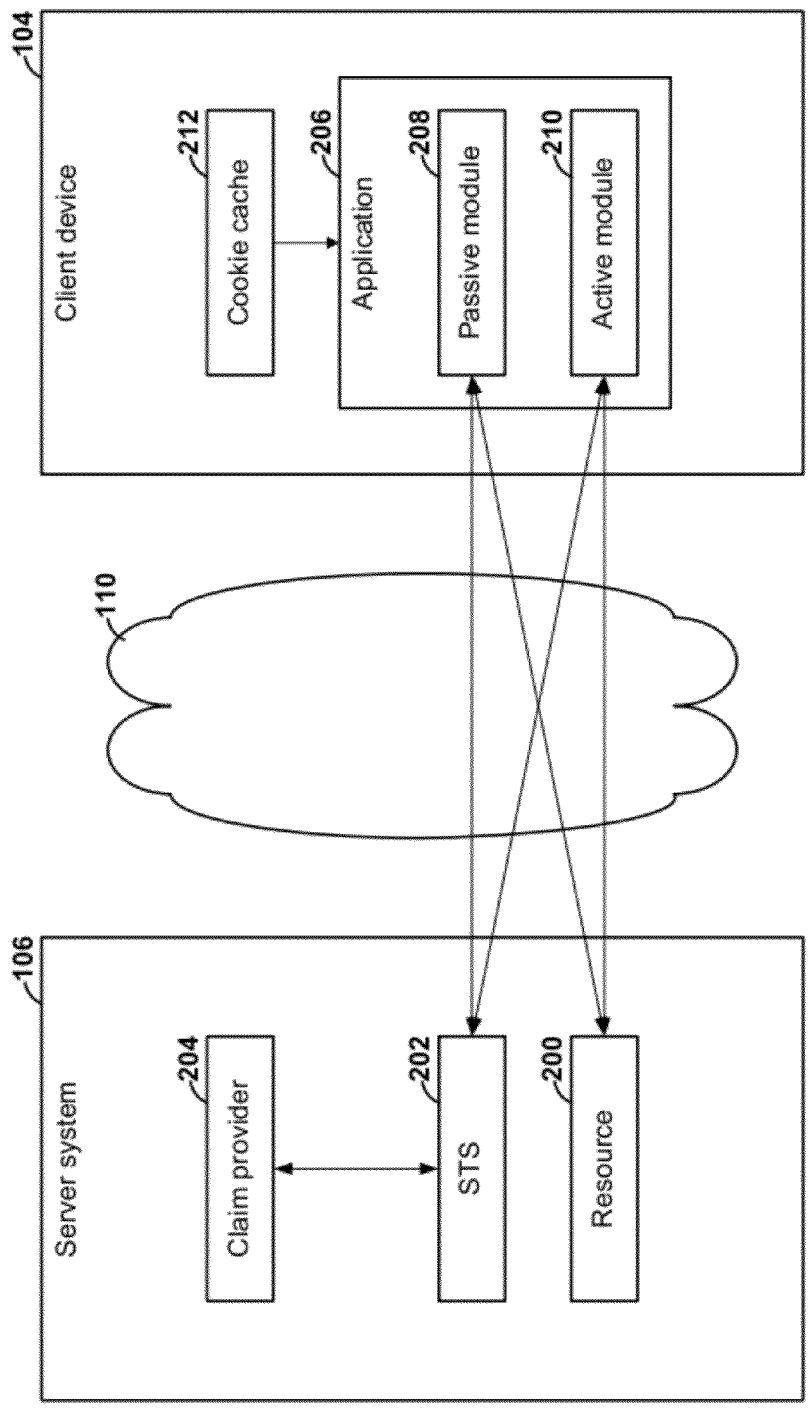
FIG. 2 is a block diagram providing example details of a client device and a server system.

FIG. 2 is a block diagram providing example details of the client device 104 and the server system 106. The server system 106 is associated with a domain name that uniquely identifies the server system 106 on the network 110. For example, the server system 106 can be associated with the domain name "www.contoso.com."

As illustrated in the example of FIG. 2, the server system 106 provides a resource 200, a security token server (STS) 202, and a claim provider 204. The resource 200 can be associated with a Uniform Resource Identifier (URI) that includes the domain name of the server system 106. For example, if the domain name of the server system 106 is "www.contoso.com," the URI of the resource 200 can be "www.contoso.com/resource200." The STS 202 can be associated with a different URI that includes the domain name of the server system 106. For example, if the domain name of the server system 106 is "www.contoso.com," the URI of the resource 200 can be "www.contoso.com/STS."

In some embodiments, the server system 106 provides the resource 200, the STS 202, and the claim provider 204 when one or more of the computing devices 108 in the server system 106 execute computer-executable instructions associated with the resource 200, the STS 202, and the claim provider 204. Such computer-executable instructions can be stored on one or more computer storage media at the server system 106.

The resource 200 is an endpoint for a web service. The web service can provide various types of services. For example, the resource 200 can be an endpoint for a directory service that provides contact information about employees of a company. In another example, the resource 200 can be an endpoint for a website hosting service that hosts a company's intranet website.

The resource 200 can provide sensitive information or perform sensitive tasks. For example, the resource 200 can provide confidential information about employees. In another example, the resource 200 can book orders for goods or services. Accordingly, only some users are authorized to access the resource 200.

Because only some users are authorized to access the resource 200, the resource 200 determines whether users, such as the user 102, are authorized to access the resource 200 before allowing the users to access the resource 200. The resource 200 can use the WS-Federation Passive Requestor Profile Protocol to determine whether users are authorized to access the resource 200. For ease of explanation, this patent document can refer to the WS-Federation Passive Requestor Profile Protocol as the "passive protocol." In addition, the resource 200 can use the WS-Federation Active Requestor Profile Protocol to determine whether users are authorized to access the resource 200. For ease of explanation, this patent document can refer to the WS-Federation Active Profile Protocol as the "active protocol."

As illustrated in the example of FIG. 2, an application 206 runs on the client device 104. The application 206 can belong to a variety of different application types. For example, the application 206 can be a word processor application (e.g., MICROSOFT® Word), a spreadsheet application (e.g., MICROSOFT® EXCEL®), a slideshow application (e.g., MICROSOFT® POWERPOINT®), an email client application (e.g., MICROSOFT® OUTLOOK®), a video game application, a software development application, or another type of application.

The application 206 comprises multiple components. Each of the components is a unit of software that runs within the application 206. For example, the components can be modules, APIs, plug-ins, classes, threads, processes, or other units of software. The components of the application 206 can perform various tasks. For example, a component of the application 206 can look up email addresses for people. In another example, another component of the application 206 can retrieve and present help content.

As illustrated in the example of FIG. 2, the application 206 comprises a "passive" component 208 and an "active" component 210. The passive component 208 and the active component 210 communicate with the server system 106 to access the resource 200. As discussed above, the resource 200 can use the passive protocol and the active protocol to determine whether users are authorized to access the resource 200. The passive component 208 is a passive requestor. In other words, the passive component 208 supports HTTP but does not utilize SOAP. Consequently, the passive component 208 is able to use the passive protocol, but is not able to use the active protocol. The active component 210 is an active requestor. In other words, the active component 210 is capable of issuing (and receiving) SOAP messages such as those described in WS-Security and WS-Trust. Consequently, the active component 210 is able to use the active protocol.

When the passive component 208 first attempts to access the resource 200 using the passive protocol, the client device 104 prompts the user 102 to provide a credential. For example, the client device 104 can prompt the user 102 to enter a username and password. In another example, the client device 104 can prompt the user 102 to provide a one-time password.

Subsequently, the active component 210 attempts to access the resource 200 using the active protocol. When the active component 210 attempt to access the resource 200 using the active protocol, the resource 200 is able to determine that the user 102 is authorized to access the resource 200 without the validation of a credential received from the user 102. Consequently, the client device 104 does not need to prompt the user 102 to enter a credential when the active component 210 attempts to access the resource 200 using the active protocol.

Furthermore, as illustrated in the example of FIG. 2, the client device 104 comprises a cookie cache 212. The cookie cache 212 stores cookies received by the client device 104. A cookie is a block of data that a server stores on a client system. The client system sends a copy of the cookie back to the server when the client system subsequently accesses the server.

Figure 3:
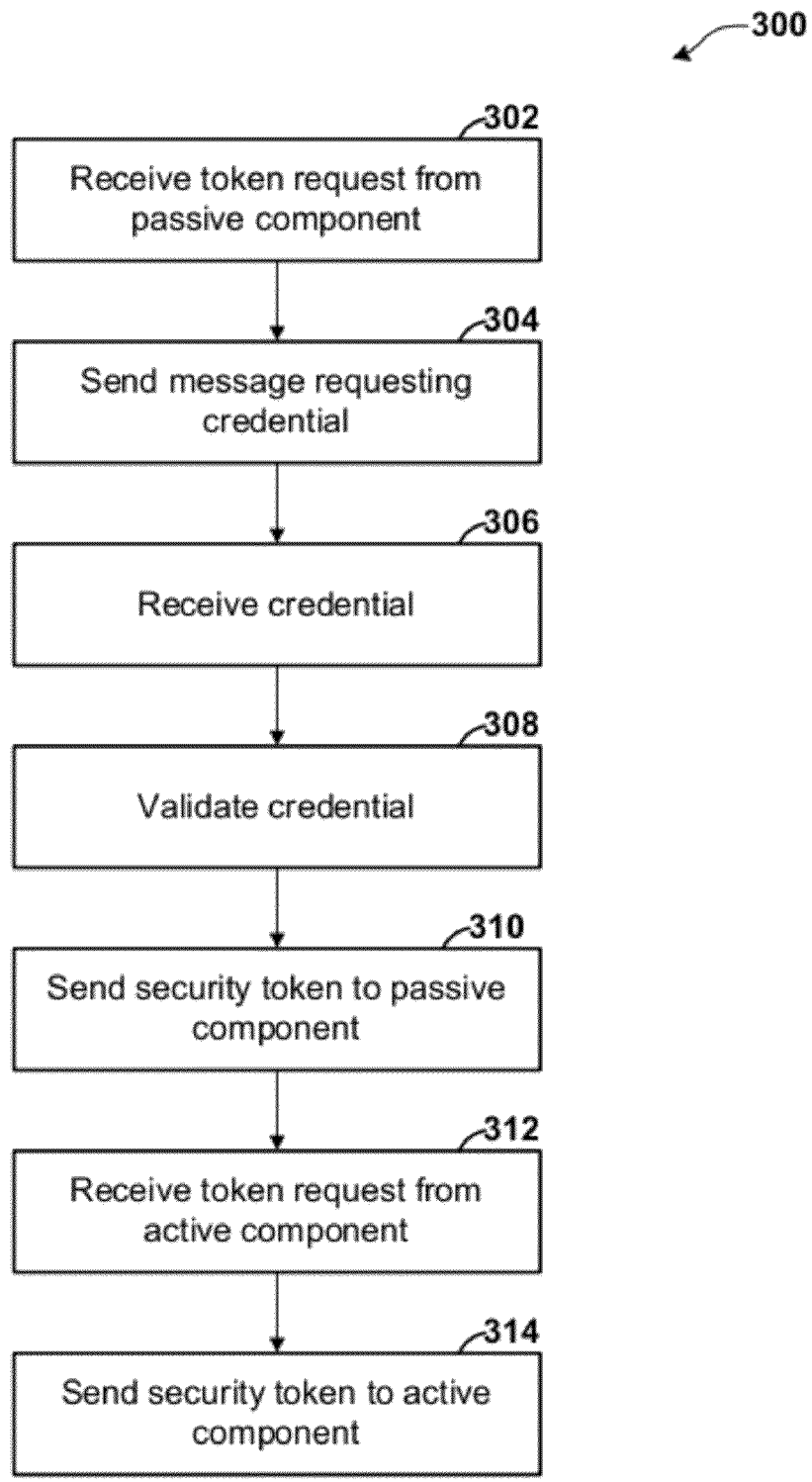
FIG. 3 is a flowchart illustrating an example operation performed by the server system.

FIG. 3 is a flowchart illustrating an example operation 300 performed by the server system 106. As illustrated in the example of FIG. 3, the STS 202 receives a token request from the passive component 208 (302). For ease of explanation, this patent document can refer to token requests from the passive component 208 as passive token requests. After receiving the token request from the passive component 208, the STS 202 sends message requesting one or more credentials for the user 102 (304). In response to this message, the passive component 208 can prompt the user 102 to provide the credentials. The STS 202 then receives the credentials for the user 102 (306). After receiving the credentials, the STS 202 validates the credentials (308). If the STS 202 successfully validates the credentials, the STS 202 sends a first security token to the passive component 208 (310). A security token is a data structure representing a collection of claims. The passive component 208 sends the first security token in access requests to the server system 106 whose fulfillment entails accessing the resource 200. The server system 106 uses the first security token to determine whether the passive component 208 is authorized to access the resource 200. In this way, the server system 106 provides the passive component 208 with access to the resource 200.

After sending the first security token to the passive component 208, the STS 202 receives a token request from the active component 210 (312). For ease of explanation, this patent document can refer to token requests from the active component 210 as active token requests. In response, the STS 202 sends a second security token to the active component 210 without sending a message to the active component 210 requesting one or more credential for the user 102 (314). The active component 210 can use this second security token in requests to the server system 106 whose fulfillment entails accessing the resource 200. The server system 106 uses the second security token to determine whether the active component 210 is authorized to access the resource 200. In this way, the server system 106 can provide the active component 210 with access to the resource 200 without prompting the user 102 to provide credentials.

Figure 4:
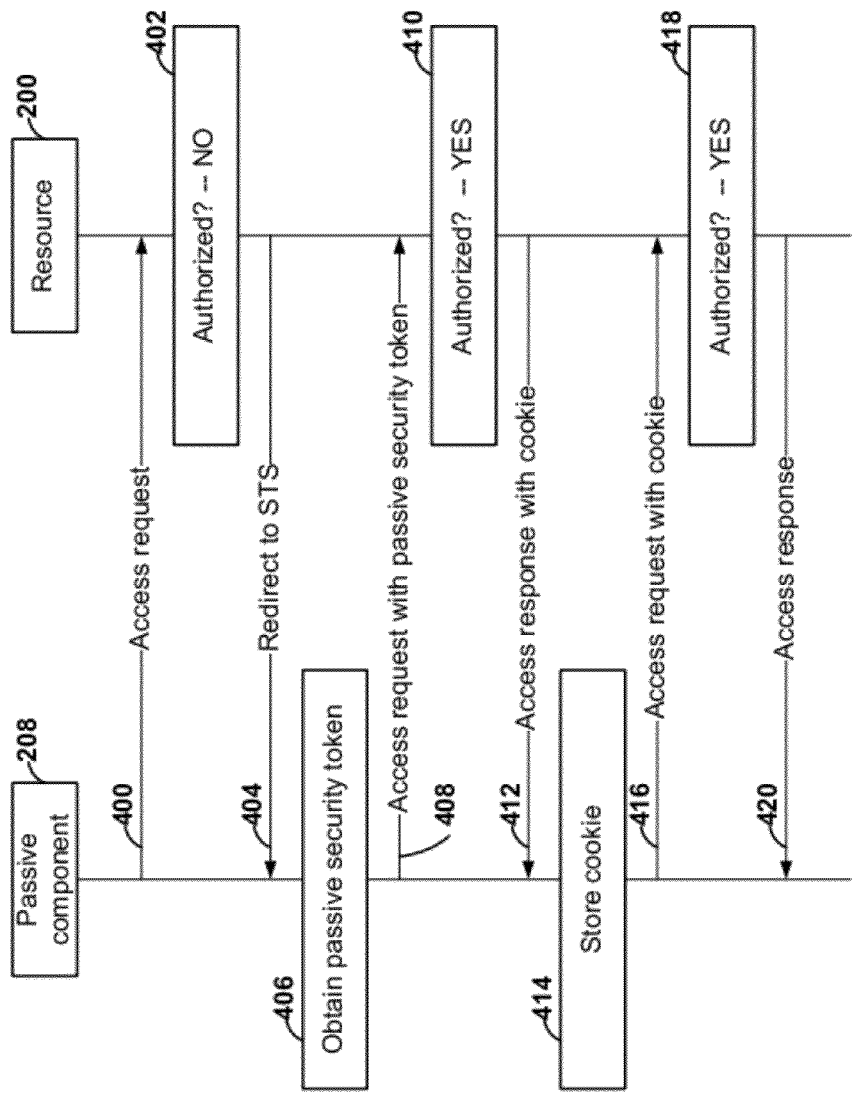
FIG. 4 is a diagram illustrating an example exchange of messages between a passive component and a resource.

FIG. 4 is a diagram illustrating an example exchange of messages between the passive component 208 and the resource 200. As illustrated in the example of FIG. 4, the passive component 208 sends a first access request to the resource 200 (400). The first access request comprises a HTTP request whose fulfillment entails accessing the resource 200. In various instances, fulfillment of the first access request can entail accessing the resource 200 in various ways. For example, the resource 200 can provide a directory service that provides contact information for employees of a company. In this example, the first access request can comprise a request to retrieve an email address of a particular employee. This patent document can refer to access requests sent by the passive component 208 as passive access requests.

Figure 5:
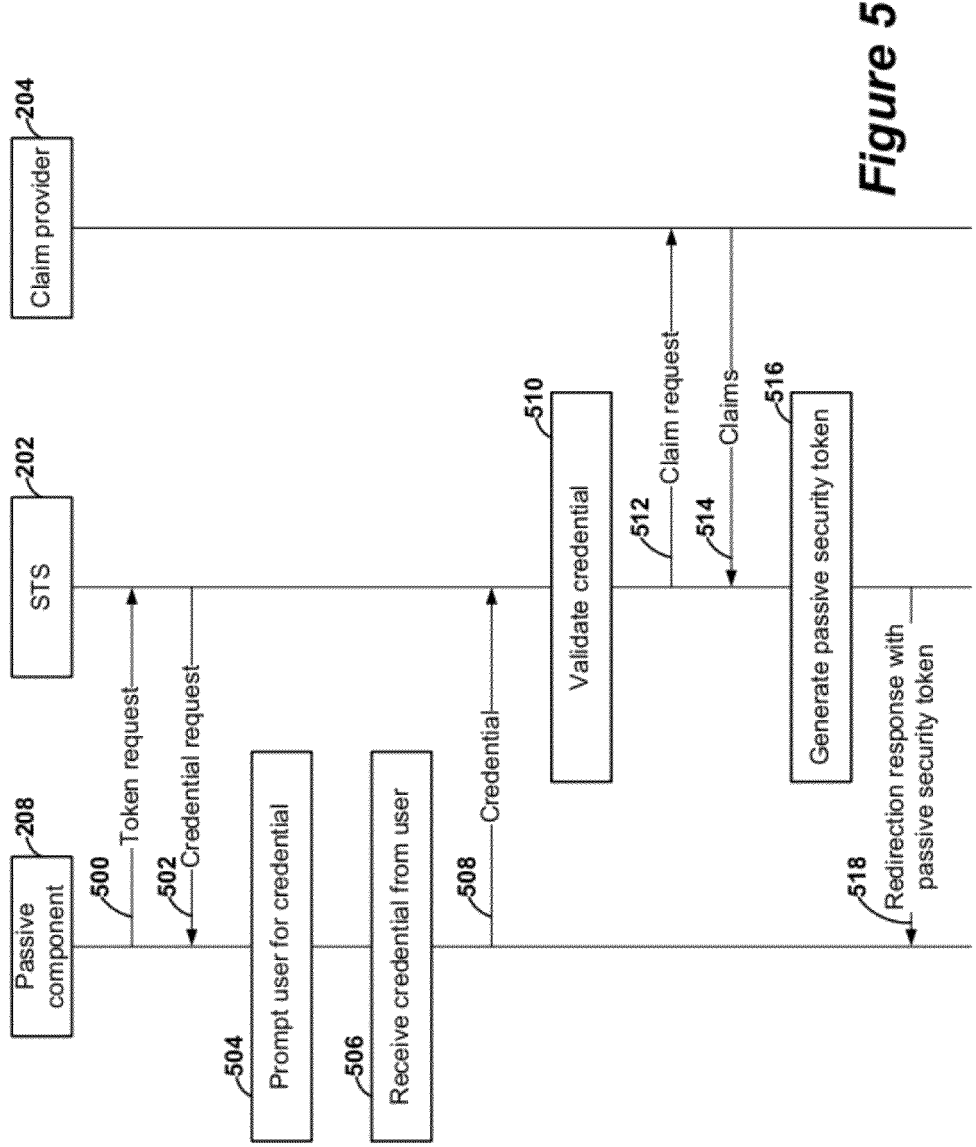
FIG. 5 is a diagram illustrating an example exchange of messages between the passive component, a Security Token Service, and a claim provider to obtain a passive security token.

In response to the first access request, the resource 200 determines whether the user 102 is authorized to access the resource 200 (402). Because the first access request does not include a security token, the resource 200 determines that the user 102 is not authorized to access the resource 200. Accordingly, the resource 200 sends a first redirection response to the passive component 208 in response to the first access request (404). The first redirection response is a HTTP redirection response that instructs the passive component 208 to automatically send a token request to the STS 202. After receiving the first redirection response, the passive component 208 obtains a security token from the STS 202 (406). This patent document can refer to this security token as the passive security token. FIG. 5, described in detail below, illustrates an example exchange of messages to obtain the passive security token.

After obtaining the passive security token, the passive component 208 automatically sends a second access request to the resource 200 (408). The second access request is a HTTP request whose fulfillment entails accessing the resource 200. The second access request includes the passive security token. The passive component 208 automatically sends the second access request to the resource 200 because a last step of obtaining the passive security token is a redirection response from the STS 202 instructing the passive component 208 to send a second access request to the resource 200. Fulfillment of the second access request can entail accessing the resource 200 in the same way as the first access request. For example, if the first access request comprised a request to retrieve an email address of a particular employee, the second access request can also comprise a request to retrieve the email address of the particular employee.

When the resource 200 receives the second access request, the resource 200 determines, based on the passive security token, whether the user 102 is authorized to access the resource 200 (410). In various embodiments, the resource 200 determines whether the user 102 is authorized to access the resource 200 in various ways. For example, the server system 106 can provide a federation component, a token handler component, a session authentication component, and an authorization component. In this example, the resource 200 forwards the passive security token to the federation component. The federation component determines whether the passive security token was digitally signed or encrypted by a security token service trusted by the resource 200. If the passive security token was digitally signed or encrypted by a trusted security token service, the federation component forwards the passive security token to the token handler component. The token handler component determines whether the passive security token include claims required to access the resource 200. In this example, if the passive security token includes claims required to access the resource 200, the authorization component indicates to the resource 200 that the user 102 is authorized to access the resource 200.

Assuming that the resource 200 determines that the user 102 is authorized to access the resource 200, the resource 200 sends a first access response to the passive component 208 (412). The first access response is a HTTP response that is responsive to the second access request. The first access response indicates that the second access request was successful. For example, the first access request can include data that explicitly or implicitly indicate that the server system 106 was able to fulfill the second access request.

The first access response comprises a cookie. The cookie in the first access response contains the passive security token. In addition to the cookie, the first access response can include various types of data. For example, if the second access request comprised a request to retrieve an email address of a particular employee as discussed in previous examples, the first access response can include the email address of the particular employee.

When the passive component 208 receives the cookie, the passive component 208 stores the cookie in the cookie cache 212 along with the domain name of the server system 106 (414). For example, if the domain name of the server system 106 is "www.contoso.com," the passive component 208 stores the cookie in the cookie cache 212 along with the domain name "www.contoso.com."

The passive component 208 may need to access the resource 200 again. For example, the passive component 208 may need an email address for a second employee. Accordingly, the passive component 208 sends a third access request to the resource 200 (416). The third access request includes the cookie containing the passive security token. When the resource 200 receives the third access request, the resource 200 determines that the user 102 is authorized to access the resource 200 based on the passive security token within the cookie in the third access request (418). Accordingly, the resource 200 responds to the third access request by sending a second access response (420). The second access response is a HTTP response that is responsive to the third access request. The second access response indicates that the third access request was successful. For example, if the third access request comprises a request for an email address of the second employee, the second access response can comprise the email address of the second employee.

FIG. 5 is a diagram illustrating an example exchange of messages between the passive component 208, the STS 202, and the claim provider 204 to obtain a passive security token. As illustrated in the example of FIG. 5, the passive component 208 sends a token request to the STS 202 in response to receiving the redirection response from the resource 200 (500). The token request is a HTTP request for a security token. The STS 202 is a web service that issues security tokens.

When the STS 202 receives the token request, the STS 202 sends a credential request to the passive component 208 (502). The credential request indicates that the STS 202 needs a credential received from the user 102. For example, the credential request can indicate that the STS 202 needs a username and password from the user 102.

In response to the credential request, the passive component 208 prompts the user 102 to provide the credential (504). For example, the passive component 208 can cause the client device 104 to display to the user 102 a dialog box requesting the credential. Subsequently, the passive component 208 receives the credential from the user 102 (506). When the passive component 208 receives the credential from the user 102, the passive component 208 sends the credential to the STS 202 (508).

When the STS 202 receives the credential, the STS 202 validates the credential (510). For example, the credential can be a username/password combination. In this example, the STS 202 can determine that the username/password combination matches a stored username/password combination.

Assuming that the STS 202 successfully validates the credential, the STS 202 sends a claims request to the claim provider 204 (512). The claims request comprises a request for the claim provider 204 to provide one or more claims. A claim is a declaration made by an entity. In the context of FIG. 5, the entity can be the claim provider 204. In some embodiments, the claims request specifies which claims are to be provided by the claim provider 204.

In response to the claims request, the claim provider 204 returns one or more claims to the STS 202 (514). The claims can be declare various things. For example, one of the claims can declare that the user 102 has a particular role (e.g., engineer) in a company. In another example, one of the claims can declare that the user 102 is younger than eighteen years of age.

Upon receiving the claims from the claim provider 204, the STS 202 generates the passive security token (516). In general, a security token represents a collection of claims. The passive security token generated by the STS 202 represents a collection of claims that includes one or more of the claims returned by the claim provider 204.

In various embodiments, the passive security token can be formatted in various ways. For example, the passive security token can be formatted as a Security Assertion Markup Language (SAML) formatted security token. Furthermore, in some embodiments, the passive security token can be a signed security token. A signed security token is a security token that is asserted and cryptographically signed by a specific authority. For instance, a signed security token can be an X.509 certificate or a Kerberos ticket.

After the STS 202 generates the passive security token, the STS 202 sends a redirection response to the passive component 208 (518). The redirection response includes the passive security token. Furthermore, the redirection response instructs the passive component 208 to automatically send to the resource 200 an access request containing the passive security token. In this way, the passive component 208 receives the passive security token and automatically sends the second access request.

Figure 6:
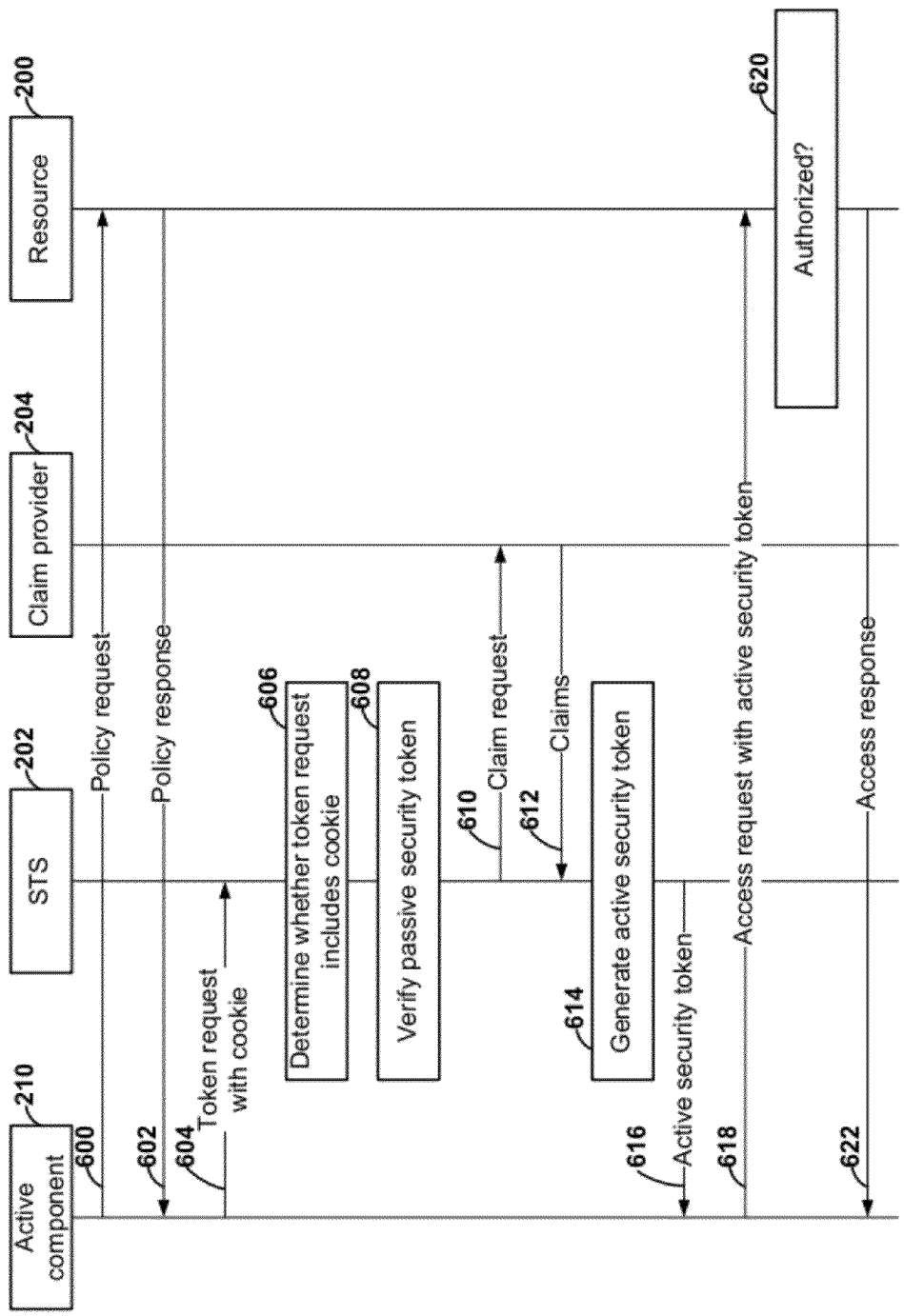
FIG. 6 is a diagram illustrating an example exchange of messages between an active component, the Security Token Service, and the resource.

FIG. 6 is a diagram illustrating an example exchange of messages between the active component 210, the STS 202, the claim provider 204, and the resource 200. As illustrated in the example of FIG. 6, the active component 210 first sends a policy request to the resource 200 (600). The policy request comprises a SOAP request to retrieve a security policy of the resource 200. In response to the policy request, the resource 200 sends a policy response to the active component 210 (602). The policy response includes a SOAP response that contains the security policy of the resource 200.

The security policy of the resource 200 can specify a set of claims that a user must be able to provide in order to be authorized to access the resource 200. For example, the security policy of the resource 200 can specify that a user must be able to provide a claim indicating that the user is an employee in a particular department of a company. In some embodiments, the security policy of the resource 200 conforms to the WS-Policy specification recommended by OASIS.

In another example, the active component 210 can send an access request to the resource 200 instead of sending the policy request. The access request comprises a SOAP request whose fulfillment entails accessing the resource 200. For example, the resource 200 can be an endpoint for a directory service that provides contact information for employees of a company. In this example, the first access request can comprise a request to retrieve a vCard for a particular employee of the company. The access request does not include a security token. Because the access request does not include a security token, the resource 200 does not allow the user 102 to access the resource 200 in the manner entailed by the resource request. Rather, the resource 200 sends an error message to the active component 210 in response to the access request. The error message includes the security policy of the resource 200. Thus, the active component 210 receives the security policy of the resource 200 if the active component 210 sends a policy request or an access request to the resource 200.

After the active component 210 receives the security policy of the resource 200, the active component 210 sends a token request to the STS 202 (604). The active component 210 sends the token request to the STS 202 as an HTTP request that encapsulates a SOAP request for a security token that includes claims required by the security policy of the resource 200. The HTTP request also includes the cookie that contains the passive security token.

When the passive component 208 received the cookie from the resource 200, the passive component 208 stored the cookie into the cookie cache 212 along with the domain name of the server system 106. When the application 206 or components of the application 206 send a HTTP request to a server having a particular domain name, the cookie cache 212 is checked to determine whether the cookie cache 212 contains a cookie associated with the particular domain name. If the cookie cache 212 contains a cookie associated with the particular domain name, the application 206 sends the cookie to the server with the HTTP request. Because the passive component 208 stored a cookie associated with the domain name of the server system 106 into the cookie cache 212 and because the STS 202 is at the server system 106, the active component 210 sends the token request to the resource 200 in a HTTP request that includes the cookie containing the passive security token.

When the STS 202 receives the token request, the STS 202 determines whether the token request was sent in a HTTP request that includes a cookie containing a security token (606). If the STS 202 determines that the token request was sent in a HTTP request that does not include a cookie containing a security token, the STS 202 can send a message to the active component 210 requesting one or more credentials for the user 102. In response, the active component 210 can prompt the user 102 to provide the credentials.

Assuming however that the token request was sent in a HTTP request that includes a cookie containing a security token, the STS 202 validates the security token (608). In other words, the STS 202 determines whether the security token was issued by a security token service trusted by the STS 202. In the current context, the security token is the passive security token previously issued by the STS 202. The STS 202 is able to determine that the passive security token was previously issued by the STS 202 because the STS 202 is able to determine that the STS 202 cryptographically signed the passive security token. The STS 202 is a security token service trusted by the STS 202. Hence, the STS 202 can be confident that the security token is authentic. The fact that the STS 202 previously issued the passive security token also indicates to the STS 202 that the STS 202 has previously authenticated an identity of the user 102. Therefore, there is no need for the STS 202 to send to the active component 210 a request for credential in order to authenticate an identity of the user 102 again.

In some embodiments, the STS 202 can perform one or more additional actions to validate the passive security token. For example, the passive security token can be associated with an expiration period. In this example, the STS 202 validates the passive security token when the expiration period for the passive security token is not yet expired. In this example, if the expiration period for the passive security token has expired, the STS 202 does not validate the passive security token. Accordingly, the STS 202 can send a credential request that requests a credential from the user 102.

After validating the passive security token, the STS 202 sends a claim request to the claim provider 204 for claims regarding the user 102 (610). As mentioned above, the token request can specify claims required by the security policy of the resource 200. In such instances, the claim request can request one or more of the claims required by the security policy of the resource 200. In response to the claim request, the claim provider 204 provides one or more claims to the STS 202 (612).

When the STS 202 receives the claims from the claim provider 204, the STS 202 generates a new security token (614). This patent document can refer to this new security token as the active security token. The active security token represents a collection of claims that includes one or more of the claims provided by the claim provider 204. In some embodiments, the passive security token and the active security token include different claims. In various embodiments, the active security token can be formatted in various ways. For example, the active security token can be formatted as a SAML formatted security token. Furthermore, in some embodiments, the active security token can be a signed security token.

After generating the active security token, the STS 202 sends a token response to the active component 210 (616). The token response comprises a SOAP response that is responsive to the token request. The token response includes the active security token.

Subsequently, the active component 210 sends an access request to the resource 200 (618). The access request comprises a SOAP request that includes the active security token. Fulfillment of the access request entails accessing the resource 200. Fulfillment of the access request can entail accessing the resource 200 in various ways. For example, the resource 200 can be an endpoint for a directory service that provides contact information for employees of a company. In this example, the first access request can comprise a request to retrieve a vCard for a particular employee of the company.

When the resource 200 receives the access request, the resource 200 determines, based on the active security token in the access request, whether the user 102 is authorized to access the resource 200 (620). In various embodiments, the resource 200 can perform various actions to determine whether the user 102 is authorized to access the resource 200. For example, the resource 200 can determine whether the active security token is cryptographically signed by a security token service trusted by the resource 200. Furthermore, the resource 200 can determine whether the active security token includes the claims required by the security policy of the resource 200.

If the resource 200 determines that the user 102 is authorized to access the resource 200, the resource 200 sends an access response to the active component 210 (622). The access response includes a SOAP response that is responsive to the access request. The access response indicates that the access request was successful. The access response can include various types of data. For example, if the access request comprises a request to retrieve a vCard for a particular employee of the company, the access response can include the vCard for the particular employee. This patent document can refer to access requests sent by the active component 210 as active access requests.

In some embodiments, the server system 106 can provide one or more resources in addition to the resource 200. For example, the server system 106 can provide endpoints for other web services. In such embodiments, the active component 210 can perform the actions illustrated in the example of FIG. 6 with regard to one of the additional resources instead of the resource 200. Thus, the active component 210 may be able to access the additional resource without prompting a user for a credential, even though the passive component 208 did not access the additional component.

Figure 7:
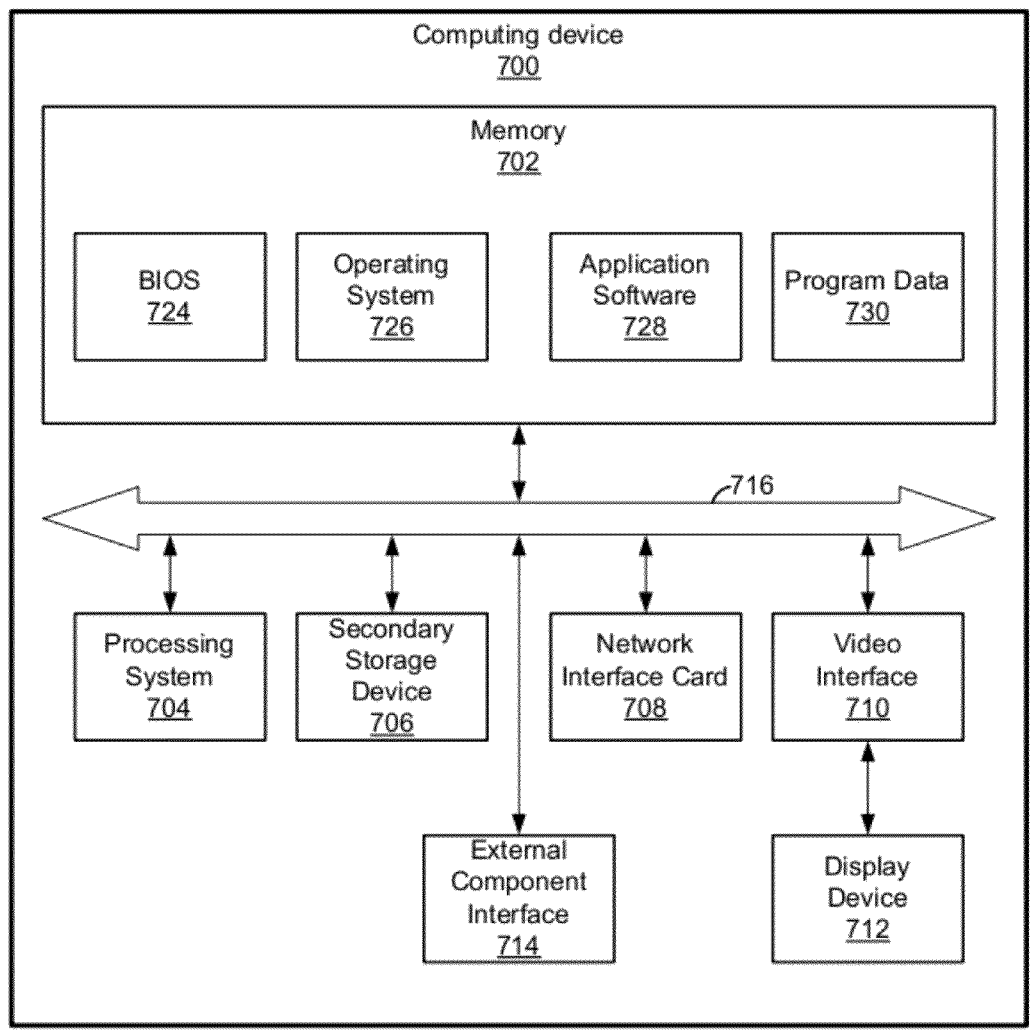
FIG. 7 is a block diagram illustrating example physical details of an electronic computing device.

FIG. 7 is a block diagram illustrating an example computing device 700. In some embodiments, the client device 104 and the computing devices 108 in the server system 106 are implemented as one or more computing devices like the computing device 700. It should be appreciated that in other embodiments, the client device 104 and computing devices 108 in the server system 106 are implemented using computing devices having hardware components other than those illustrated in the example of FIG. 7.

The term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In the example of FIG. 7, the computing device 700 comprises a memory 702, a processing system 704, a secondary storage device 706, a network interface card 708, a video interface 710, a display unit 712, an external component interface 714, and a communication medium 716. The memory 702 includes one or more computer storage media capable of storing data and/or instructions. In different embodiments, the memory 702 is implemented in different ways. For example, the memory 702 can be implemented using various types of computer storage media.

The processing system 704 includes one or more processing units. A processing unit is a physical device or article of manufacture comprising one or more integrated circuits that selectively execute software instructions. In various embodiments, the processing system 704 is implemented in various ways. For example, the processing system 704 can be implemented as one or more processing cores. In another example, the processing system 704 can comprise one or more separate microprocessors. In yet another example embodiment, the processing system 704 can comprise an application-specific integrated circuit (ASIC) that provides specific functionality. In yet another example, the processing system 704 provides specific functionality by using an ASIC and by executing computer-executable instructions.

The secondary storage device 706 includes one or more computer storage media. The secondary storage device 706 stores data and software instructions not directly accessible by the processing system 704. In other words, the processing system 704 performs an I/O operation to retrieve data and/or software instructions from the secondary storage device 706. In various embodiments, the secondary storage device 706 comprises various types of computer storage media. For example, the secondary storage device 706 can comprise one or more magnetic disks, magnetic tape drives, optical discs, solid state memory devices, and/or other types of computer storage media.

The network interface card 708 is a device or article of manufacture that enables the computing device 700 to send data to and receive data from a communication network. In different embodiments, the network interface card 708 is implemented in different ways. For example, the network interface card 708 can be implemented as an Ethernet interface, a token-ring network interface, a fiber optic network interface, a wireless network interface (e.g., Wi-Fi, WiMax, etc.), or another type of network interface.

The video interface 710 enables the computing device 700 to output video information to the display unit 712. The display unit 712 can be various types of devices for displaying video information, such as a cathode-ray tube display, an LCD display panel, a plasma screen display panel, a touch-sensitive display panel, an LED screen, or a projector. The video interface 710 can communicate with the display unit 712 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 714 enables the computing device 700 to communicate with external devices. For example, the external component interface 714 can be a USB interface, a FireWire interface, a serial port interface, a parallel port interface, a PS/2 interface, and/or another type of interface that enables the computing device 700 to communicate with external devices. In various embodiments, the external component interface 714 enables the computing device 700 to communicate with various external components, such as external storage devices, input devices, speakers, modems, media player docks, other computing devices, scanners, digital cameras, and fingerprint readers.

The communications medium 716 facilitates communication among the hardware components of the computing device 700. In the example of FIG. 7, the communications medium 716 facilitates communication among the memory 702, the processing system 704, the secondary storage device 706, the network interface card 708, the video interface 710, and the external component interface 714. The communications medium 716 can be implemented in various ways. For example, the communications medium 716 can comprise a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718 and an operating system 720. The BIOS 718 includes a set of computer-executable instructions that, when executed by the processing system 704, cause the computing device 700 to boot up. The operating system 720 includes a set of computer-executable instructions that, when executed by the processing system 704, cause the computing device 700 to provide an operating system that coordinates the activities and sharing of resources of the computing device 700. Furthermore, the memory 702 stores application software 722. The application software 722 comprises computer-executable instructions, that when executed by the processing system 704, cause the computing device 700 to provide one or more applications. The memory 702 also stores program data 724. The program data 724 is data used by programs that execute on the computing device 700.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for accessing resources of a server system, the method comprising:
   sending, by the server system, a first credential request to a passive requestor at a client device;
   after sending the first credential request, receiving, by the server system, a valid credential for a user of the client device;
   after receiving the valid credential, providing, by the server system, the passive requestor with access to a first resource of the server system;
   after providing the passive requestor with access to the first resource, providing, by the server system, an active requestor at the client device with access to a second resource without sending a second credential request to the active requestor, the second resource being the first resource or another resource of the server system, wherein providing the active requestor with access to the second resource comprises:
      receiving an active access request at the server system, the active access request being from the active requestor, the active access request including an active security token, fulfillment of the active access request entailing accessing the second resource; and
      determining, by the server system, that the user is authorized to access the second resource based on the active security token;
   sending, by the server system, a cookie to the passive requestor, the cookie containing a passive security token;
   receiving an active token request at the server system, the active token request being from the active requestor, the active token request being in a HTTP request that includes the passive security token;
   in response to receiving the active token request, sending, by the server system, an active security token to the active requestor without sending the second credential request to the active requestor;
   receiving a passive token request at the server system, the passive token request being from the passive requestor;
   prior to receiving the passive token request from the passive requestor, receiving a second passive access request at the server system, the second passive access request being from the passive requestor, the second passive access request being an HTTP request whose fulfillment entails accessing the first resource;
   in response to receiving the second passive access request, sending, by the server system, a second redirection response to the passive requestor, the second redirection response instructing the passive requestor to automatically send the passive token request to the server system;
   sending, by the server system, a first redirection response to the passive requestor, the first redirection response including the passive security token, the first redirection response instructing the passive requestor to automatically send a first passive access request to the server system;
   receiving the first passive access request at the server system, the first passive access request from the passive requestor, fulfillment of the first passive access request entailing accessing the first resource, the first passive access request including the passive security token;
   sending, by the server system, a first passive access response to the passive requestor in response to the first passive access request, the first passive access response including the cookie;
   wherein the server system is associated with a domain name;
   wherein receiving the active token request comprises receiving the active token request at a Security Token Server (STS) provided by the server system, the STS associated with a URI that includes the domain name; and
   wherein receiving the passive token request comprises receiving the passive token request at the STS.

2. The method of claim 1, wherein receiving the active access request comprises receiving a HTTP request that includes the active security token and the active access request.

3. The method of claim 1, further comprising sending, by the server system, a security policy for the second resource to the active requestor prior to receiving the active token request and the active access request.

4. The method of claim 1, further comprising in response to receiving the active token request, determining, by the STS, that the STS cryptographically signed the active security token.

5. The method of claim 1,
   wherein the active security token has a first expiration period; and
   wherein the method further comprises:
      determining, by the STS, that the first expiration period has not expired, wherein the STS sends the active security token to the active component in response to determining that the first expiration period has not expired;
      receiving, by the STS, an additional security token request, the second cookie including an additional security token issued by the STS, the additional security token having a second expiration period;
      determining, by the STS, that the second expiration period has expired; and
      sending, by the STS, a third credential request to the client device in response to determining that the second expiration period has expired, the third credential request requesting a credential from the user.

6. A client device comprising:
- a computer storage medium that stores computer-executable instructions;
- a network interface; and
- a processing unit that executes the computer-executable instructions stored in the computer storage medium, execution of the computer-executable instructions causing the client device to:
  - prompt a user of the client device to provide a credential while obtaining a first security token from a Security Token Service (STS) provided by a server system;
  - send a first access request to the server system, the first access request being a HTTP request whose fulfillment entails accessing a first resource, the first resource provided by the server system, the first access request including the first security token;
  - after obtaining the first security token, obtain a second security token from the STS without prompting the user for a credential for a second time;
  - after obtaining the second security token, send a second access request to the server system, the second access request comprising a SOAP request whose fulfillment entails accessing a second resource provided by the server system, the second resource being the first resource or another resource provided by the server system, the second access request including the second security token;
  - wherein execution of the computer-executable instructions by the processing unit further causes the client device to:
  - send a third access request to the server system prior to obtaining the first security token, the third access request being a HTTP request whose fulfillment entails accessing the first resource, the third access request not comprising the first security token;
  - send a first token request to the server system in response to receiving a first redirection response, the first token request being a HTTP request to obtain the first security token from the STS, the first redirection response being a HTTP response that is responsive to the third access request, the first redirection response redirecting the client device to the STS;
  - send the credential to the server system;
  - wherein execution of the computer-executable instructions causes the client device to send the first access request to the server system in response to receiving a second redirection response from the STS, the second redirection response being a HTTP response redirecting the client device to the first resource, the second redirection response including the first security token;
  - wherein the client device receives a security policy for the second resource;
  - wherein after the client device receives the security policy from the server system, execution of the computer-executable instructions cause the client device to obtain the second security token by causing the client device to send a second token request to the server system, the second token request comprising a SOAP request to obtain the second security token from the STS, the second token request specifying required claims;
  - wherein the second security token includes the required claims;
  - wherein execution of the computer-executable instructions further causes the client device to store a cookie in a cookie cache in response to receiving a first access response from the server system, the first access response being a HTTP response that is responsive to the first access request, the first access response indicating that the first access request was successful, the first access response including the cookie, the cookie containing the first security token; and
  - wherein the second access request is a HTTP request that also includes the cookie.

7. The client device of claim 6,
- wherein the server system is associated with a domain name;
- wherein the STS is associated with a URI that includes the domain name;
- wherein the first token request and the second token request specify the URI associated with the STS;
- wherein execution of the computer-executable instructions causes the client device to store the domain name of the server system along with the cookie in the cookie cache; and
- wherein after the client device stores the cookie in the cookie cache and prior to sending the second token request, execution of the computer-executable instructions causes the client device to determine, based on the domain name of the server system, that the cookie cache includes the cookie.

8. The client device of claim 6,
- wherein execution of the computer-executable instructions causes the client device to send a fourth access request to the server system, the fourth access request comprising a SOAP request whose fulfillment entails accessing the first resource or the other resource, the fourth access request not including the second security token; and
- wherein the client device receives a security policy response from the server system, the security policy response being a SOAP response that is responsive to the fourth access request, the security policy response specifying the security policy for the second resource, the security policy response not indicating that the fourth access request was successful.

9. The client device of claim 6, wherein prior to the client device obtaining the second security token, execution of the computer-executable instructions causes the client device to send a policy request to the server system, the policy request comprising a SOAP request for the security policy of the second resource.

10. The client device of claim 6, wherein the first security token and the second security token include different claims.

11. The client device of claim 6, wherein execution of the computer-executable instructions causes the client device to provide a thick-client application that includes a first component and a second component, the first component obtaining the first security token and sending the first access request to the server system, the second component obtaining the second security token and sending the second access request.

12. A computer storage medium, wherein the computer-readable storage medium does not include a transmission signal, the computer-readable storage medium comprising computer-executable instructions, execution of the computer-executable instructions by a client device causing the client device to:
- send a first access request to a server system, the first access request being a Hypertext Transfer Protocol (HTTP) request whose fulfillment entails accessing a first resource provided by the server system, the first resource being an endpoint for a web service;
- receive a first redirection response from the server system, the first redirection response being a HTTP response that is responsive to the first access request, the first redirection response redirecting the client device to a Security Token Service (STS) provided by the server system;

in response to receiving the first redirection response, automatically send a first token request to the server system, the first token request being a HTTP request for a first security token from the STS;

receive a credential request from the STS;

in response to receiving the credential request, prompt a user of the client device to provide a credential;

receive the credential from the user;

after receiving the credential from the user, send the credential to the STS;

receive a second redirection response from the STS, the second redirection response including the first security token, the second redirection response being a HTTP response redirecting the client device to the first resource;

in response to receiving the first redirection response, automatically send a second access request to the server system, the second access request including the first security token, the second access request being a HTTP request whose fulfillment entails accessing the first resource;

receive a first access response from the server system, the first access response being a HTTP response that is responsive to the second access request, the first access response indicating that the second access request was successful, the first access response including a cookie, the cookie including the first security token;

in response to receiving the first access response, store the cookie;

after storing the cookie, send a second token request to the STS, the second token request being a SOAP request encapsulated in a HTTP request that includes the cookie;

receive a token response from the STS, the token response being a SOAP response that is responsive to the second token request, the token response including a second security token, the client device receiving the token response from the STS without sending any credential received from the user to the STS;

send a third access request to the server system, the third access request being a SOAP request whose fulfillment entails accessing a second resource, the second resource being the first resource or another resource provided by the server system, the third access request including the second security token; and receive a second access response from the server system, the second access response being a SOAP response that is responsive to the third access request, the second access response indicating that the third access request was successful.

* * * * *